(12) United States Patent
Suzuki et al.

(10) Patent No.: US 11,592,079 B2
(45) Date of Patent: Feb. 28, 2023

(54) HELICALLY TOOTHED BELT POWER TRANSMITTING DEVICE

(71) Applicant: Mitsuboshi Belting Ltd., Kobe (JP)

(72) Inventors: Norihito Suzuki, Hyogo (JP); Masakuni Yoshida, Hyogo (JP); Isao Ideguchi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 295 days.

(21) Appl. No.: 16/607,585

(22) PCT Filed: Mar. 28, 2018

(86) PCT No.: PCT/JP2018/013062
§ 371 (c)(1),
(2) Date: Oct. 23, 2019

(87) PCT Pub. No.: WO2018/198657
PCT Pub. Date: Nov. 1, 2018

(65) Prior Publication Data
US 2020/0049230 A1    Feb. 13, 2020

(30) Foreign Application Priority Data

Apr. 27, 2017 (JP) .............................. JP2017-088566
Mar. 2, 2018 (JP) .............................. JP2018-037197

(51) Int. Cl.
*F16G 1/28* (2006.01)
*F16G 1/04* (2006.01)
(Continued)

(52) U.S. Cl.
CPC ................. *F16G 1/28* (2013.01); *F16G 1/04* (2013.01); *F16G 1/06* (2013.01); *F16H 7/023* (2013.01); *F16H 55/171* (2013.01); *B60T 13/74* (2013.01)

(58) Field of Classification Search
CPC .............. F16G 1/28; F16G 1/10; F16H 7/023
(Continued)

(56) References Cited

U.S. PATENT DOCUMENTS 5,735,763 A  *  4/1998  Kawahara ................. F16G 1/08
                                                                474/263
6,203,886 B1 *  3/2001  Kikuchi ................. B29D 29/08
                                                                428/163
(Continued)

FOREIGN PATENT DOCUMENTS

CN      1902414 A     1/2007
CN    202806711 U     3/2013
(Continued)

OTHER PUBLICATIONS

Dec. 9, 2020—(EP) Extended Search Report—App 18791688.7.
(Continued)

*Primary Examiner* — Henry Y Liu
(74) *Attorney, Agent, or Firm* — Banner & Witcoff, Ltd.

(57) ABSTRACT

This helically toothed belt power transmitting device (1) has: a toothed belt (10) having a plurality of teeth (12) tilted relative to the width direction of the belt; a drive pulley; and a driven pulley. The width of the helically toothed belt (10) is 1 mm to 20 mm, inclusive. The core (13) of the toothed belt (10) is a twisted cord containing high-strength glass fibers or carbon fibers and has a diameter of 0.2 mm to 0.9 mm, inclusive. The compressibility of the teeth (12) of the toothed belt (10) compressed by the grooves of the drive pulley and the driven pulley is 0% to 5%, inclusive.

12 Claims, 4 Drawing Sheets

(51) Int. Cl.
*F16G 1/06* (2006.01)
*F16H 7/02* (2006.01)
*F16H 55/17* (2006.01)
*B60T 13/74* (2006.01)

(58) Field of Classification Search
USPC ........................................................ 474/205
See application file for complete search history.

(56) References Cited

U.S. PATENT DOCUMENTS

| | | | | |
|---|---|---|---|---|
| 6,532,810 | B1* | 3/2003 | Ahmed | G01M 13/023 73/114.77 |
| 9,670,985 | B2* | 6/2017 | Sekiguchi | F16G 1/10 |
| 2003/0089576 | A1* | 5/2003 | Peter | B60T 7/107 192/219.5 |
| 2003/0130077 | A1* | 7/2003 | Knutson | F16G 1/08 474/260 |
| 2004/0152551 | A1* | 8/2004 | Okuno | D03D 1/00 474/263 |
| 2007/0066431 | A1* | 3/2007 | Hironaka | F16H 7/023 474/205 |
| 2007/0137766 | A1 | 6/2007 | Matsuda et al. | |
| 2007/0232429 | A1* | 10/2007 | Knox | F16G 1/28 474/205 |
| 2009/0197726 | A1* | 8/2009 | Obora | F16G 1/10 474/205 |
| 2013/0056305 | A1* | 3/2013 | Sanchez | B66B 7/062 187/255 |
| 2014/0206487 | A1* | 7/2014 | Tomobuchi | C08K 5/3415 474/205 |
| 2015/0152941 | A1* | 6/2015 | Sekiguchi | F16G 1/10 474/148 |
| 2016/0084357 | A1* | 3/2016 | Yuan | F16H 9/24 474/148 |
| 2016/0084358 | A1* | 3/2016 | Yuan | F16H 9/24 474/148 |
| 2016/0221637 | A1 | 8/2016 | Osaki et al. | |
| 2017/0191545 | A1* | 7/2017 | Sekiguchi | C08G 18/10 |
| 2018/0313431 | A1* | 11/2018 | McNamee | F16G 3/10 |
| 2019/0011016 | A1* | 1/2019 | Yoshida | C08L 23/08 |

FOREIGN PATENT DOCUMENTS

| | | |
|---|---|---|
| CN | 105492800 A | 4/2016 |
| DE | 102008030535 A1 | 12/2009 |
| FR | 2686959 A1 | 8/1993 |
| JP | H11-013840 A | 1/1999 |
| JP | 2000-320626 A | 11/2000 |
| JP | 2004-308702 A | 11/2004 |
| KR | 10-2015-0098620 A | 8/2015 |
| WO | 2005/054708 A1 | 6/2005 |
| WO | 2014-091672 A1 | 6/2014 |

OTHER PUBLICATIONS

Dec. 4, 2020—(KR) Office Action—App 10-2019-7031483.
Dec. 4, 2020—(CA) Office Action—App 3,059,540.
Apr. 28, 2020—(JP) Notification of Reasons for Refusal—App 2018-037197, Eng Tran.
Jun. 23, 2021—(CA) Office Action—App 3,059,540.
Jun. 18, 2021—(KR) Office Action—App 10-2019-7031483.
May 22, 2018—International Search Report—Intl App PCT/JP2018/013062.
Nov. 22, 2018—(TW) Office Action—App 107111185.
Apr. 29, 2019—(TW) Office Action—App 107111185.
Dec. 24, 2021—(KR) Decision to Refuse a Patent—App 10-2019-7031483.
Oct. 8, 2021—(EP) Office Action—App 18791688.7.
Mar. 18, 2022—(CN) Notification of First Office Action—App 201880026855.8.
Apr. 14, 2022—(KR) Office Action—App 10-2022-7005454.
Oct. 24, 2022—(KR) Decision—KR App 10-2019-7031483, Eng. Tran.
Dec. 14, 2022—(CN) Notification of the Second Office Action—CN App 201880026855.8, Eng. Tran.

* cited by examiner

[FIG. 1]
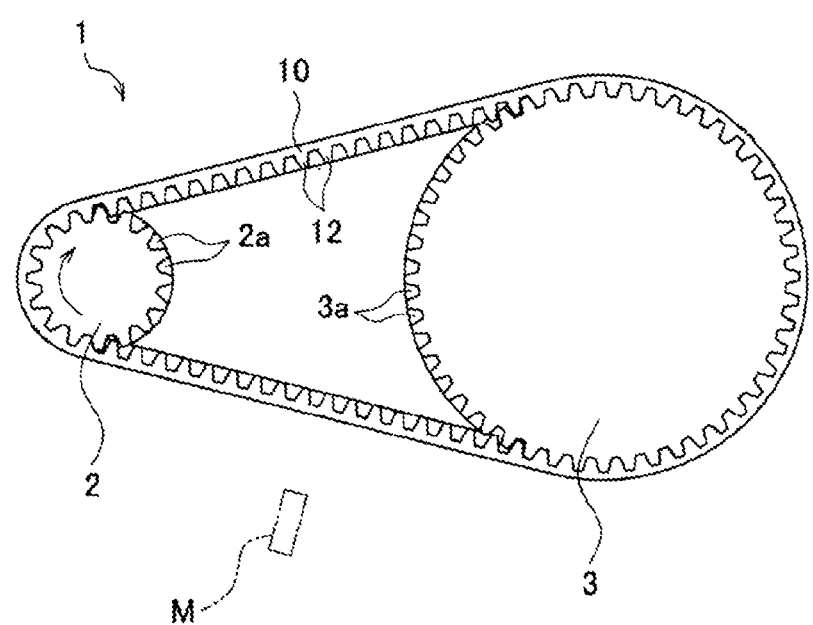

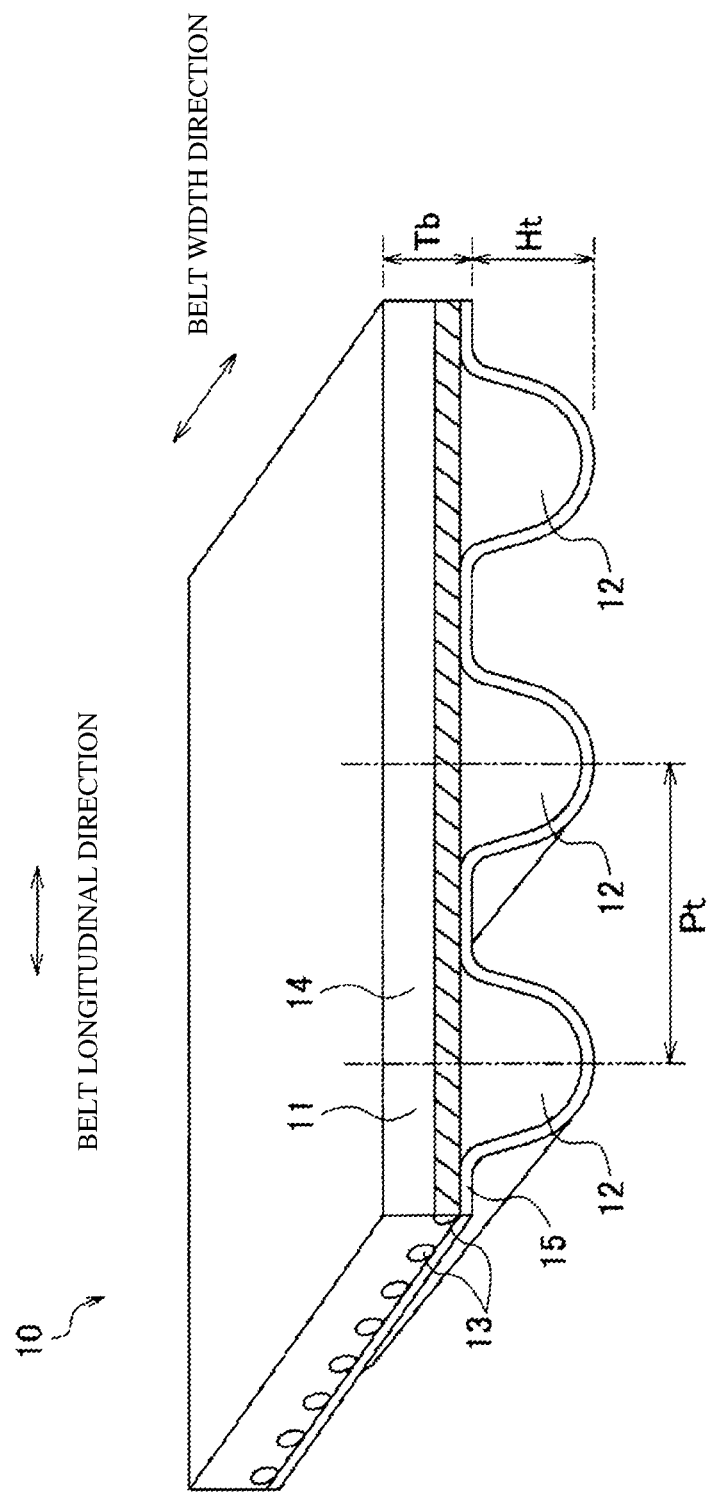

[FIG. 3]
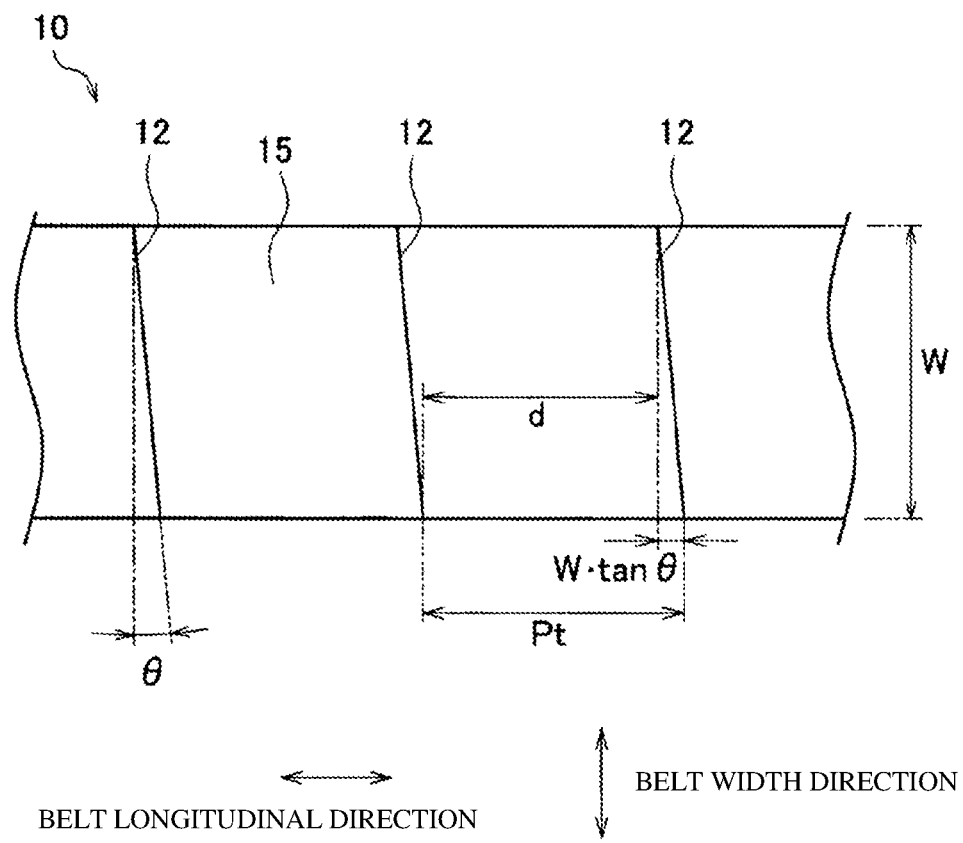
[FIG. 4]
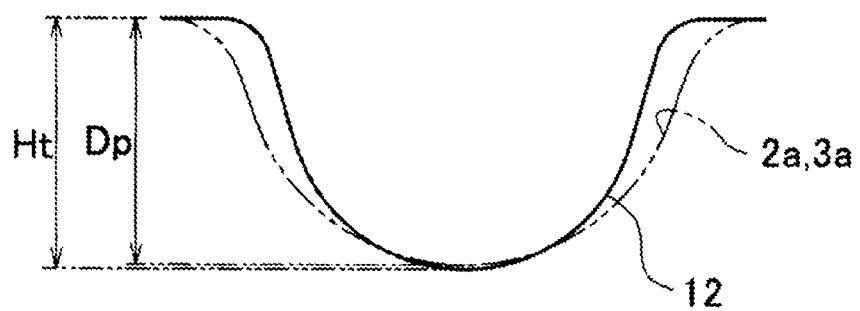

[FIG. 5]
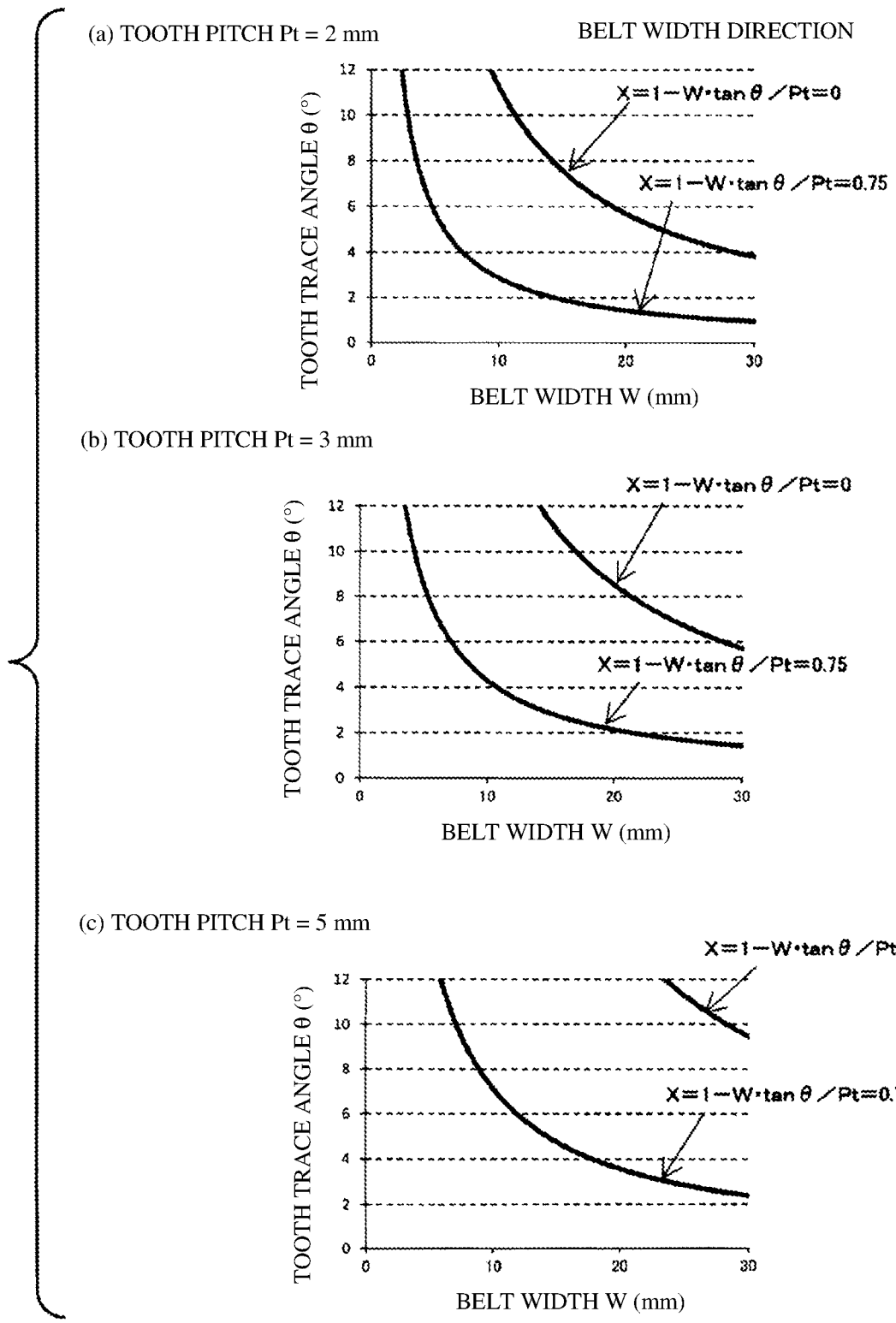

HELICALLY TOOTHED BELT POWER TRANSMITTING DEVICE

CROSS REFERENCE TO RELATED APPLICATIONS

This is a U.S. National Phase Application under 35 U.S.C. § 371 of International Application No. PCT/JP2018/013062, filed Mar. 28, 2018, which claims priority to Japanese Application Nos. 2017-088566, filed Apr. 27, 2017 and 2018-037197, filed Mar. 2, 2018, which was published Under PCT Article 21(2), the entire contents of which are incorporated herein by reference.

TECHNICAL FIELD

The present invention relates to a helical toothed belt power-transmission device in which a helical toothed belt is used at high load or high-speed rotation.

BACKGROUND ART

A helical toothed belt is a belt having tooth portions arranged obliquely with respect to a belt width direction.

Such helical toothed belt may be used in a belt power-transmission device used in a high load or high-speed rotation environment. In the case where a straight toothed belt having tooth portions extending parallel to a belt width direction is used in a belt power-transmission device used at high load or high-speed rotation, large noise and vibration may be generated at the time of starting and ending of the meshing between the tooth portions of the belt and tooth portions of a pulley in some cases. On the other hand, in the case where the helical toothed belt is used, the meshing between the tooth portions of the belt and the tooth portions of the pulley progresses sequentially from one end to the other end of the tooth portions. Therefore, noise and vibration can be reduced as compared with a belt power-transmission device using the straight toothed belt.

As described above, the helical toothed belt is capable of reducing the noise and vibration as compared with the straight toothed belt. However, depending on the usage of the belt power-transmission device, it is desirable to further reduce the noise. For example, Patent Literature 1 discloses a technique for further reducing noise and vibration in a helical toothed belt power-transmission device used at high load or high-speed rotation. In Patent Literature 1, a tooth trace angle θ is set to a value that satisfies $-0.2 \leq 1 - W \cdot \tan \theta / Pt \; 0.75$ with a tooth pitch being Pt and a belt width being W.

Furthermore, the helical toothed belt power-transmission device is also used in an electric parking brake system. The electric parking brake system is a mechanism that adjusts a braking force applied to wheels by operating an electric motor when the vehicle is parked (see, e.g., Patent Literatures 2 and 3). The helical toothed belt power-transmission device is used to transmit a driving force of the electric motor. In the electric parking brake system, a helical toothed belt whose belt width is relatively narrow with respect to tooth pitch is used.

PRIOR ART LITERATURE

Patent Literature

Patent Literature 1: JP-A 2004-308702
Patent Literature 2: German Patent Application Publication No. 1202008030535
Patent Literature 3: CN-U-202806711

SUMMARY OF INVENTION

Technical Problem

In recent years, since the quietness of automobiles has progressed, it is required to further reduce noise in an electric parking brake system.

However, the technique in Patent Literature 1 is for a helical toothed belt whose belt width is relatively wide with respect to tooth pitch. Therefore, the technique of Patent Literature 1 cannot be applied to a helical toothed belt power-transmission device of an electric parking brake system.

Therefore, an object of the present invention is to further reduce noise and vibration in a helical toothed belt power-transmission device, in which a helical toothed belt having a narrow width is used at high load or high-speed rotation.

Solution to Problem

The helical toothed belt power-transmission device of the present invention is a helical toothed belt power-transmission device including: a helical toothed belt including a back portion in which a tension member is embedded, and a plurality of tooth portions which are provided on one surface of the back portion at prescribed intervals along a belt longitudinal direction and each of which is inclined with respect to a belt width direction, surfaces of the tooth portions being formed of a tooth fabric; a drive pulley including drive pulley grooves meshing with the tooth portions and being configured to be rotatably driven by a drive source; and a driven pulley including driven pulley grooves meshing with the tooth portions, in which the helical toothed belt has a belt width of 1 mm or more and 20 mm or less, in which the tension member is a twisted cord including a high-strength glass fiber or a carbon fiber and having a diameter of 0.2 mm or more and 0.9 mm or less, and in which a compression ratio of the tooth portions due to the drive pulley grooves and the driven pulley grooves is 0% or more and 5% or less. The compression ratio of the tooth portions is defined as (tooth height−pulley groove depth)/tooth height×100.

According to this configuration, the helical toothed belt has a relatively small belt width as 1 mm or more and 20 mm or less, and thus can be used in, for example, an electric parking brake system.

The compression ratio of the tooth portions of the helical toothed belt due to the pulley grooves is 0% or more and 5% or less. That is, tooth tips of the tooth portions come into contact with the pulley grooves. In the case of a conventional helical toothed belt power-transmission device in which tooth tips of tooth portions do not come into contact with pulley grooves, a load applied to the belt at the time of traveling cannot be borne by the tooth tips of the tooth portions, leading to a state where all of the load applied to the belt is borne only by tooth bottoms of the belt. Therefore, vertical movement of the belt (string vibration), which occurs when the tooth portions mesh with the pulley grooves, is violent, and vibration and noise are likely to occur. In the present invention, the tooth tips of the tooth portions come into contact with the pulley grooves, and the load applied to the belt is distributed to the tooth tips as well. Therefore, even in the case of being used at high load or high-speed rotation, vibration and noise can be prevented. Furthermore, since the tooth tips of the tooth portions come into contact with the pulley grooves, positioning accuracy of the tooth portions with respect to the pulley grooves is improved, and improper interference in meshing between the tooth portions and the pulley grooves is prevented. Accordingly, vibration and noise can be further prevented.

Moreover, the tension member embedded in the back portion of the helical toothed belt is formed of a twisted cord containing a high-strength glass fiber or carbon fiber, which is a high-strength (high elastic modulus) fiber material, and having a diameter of 0.2 mm or more and 0.9 mm or less. Therefore, rigidity of the back portion can be enhanced by the tension member while securing bendability of the back portion. Since the rigidity of the back portion is enhanced, even in the case of being used at high load or high-speed rotation, vibration (string vibration) about the tension member of the helical toothed belt generated when the tooth portions mesh with the tooth portions of the pulley can be prevented. Therefore, noise generated by this vibration can be reduced.

In this way, the helical toothed belt power-transmission device of the present invention can further prevent noise and vibration due to the compression ratio of tooth portions and the rigidity of the back portion even in the case where a helical toothed belt having a narrow width is used at high load or high-speed rotation.

The helical toothed belt power-transmission device of the present invention preferably satisfies $1-W\cdot\tan\theta/Pt>0$ when a tooth pitch of the helical toothed belt is Pt, a belt width is W, and a tooth trace angle with respect to the belt width direction is $\theta$.

The helical toothed belt power-transmission device of the present invention more preferably satisfies $1-W\cdot\tan\theta/Pt>0.75$.

In the helical toothed belt power-transmission device of the present invention, it is preferable that the plurality of tooth portions have a tooth pitch of 2 mm or more and 5 mm or less, and that in a case where the tooth pitch is 2 mm or more and less than 3 mm, the tooth portions have a tooth height of 0.7 mm or more and 2.0 mm or less, in a case where the tooth pitch is 3 mm or more and less than 4 mm, the tooth portions have a tooth height of 1.0 mm or more and 2.3 mm or less, and in a case where the tooth pitch is 4 mm or more and 5 mm or less, the tooth portions have a tooth height of 1.5 mm or more and 2.3 mm or less.

In the helical toothed belt power-transmission device of the present invention, it is preferable that the plurality of tooth portions have a tooth pitch of 2 mm or more and 5 mm or less, and that in a case where the tooth pitch is 2 mm or more and less than 3 mm, the back portion has a thickness of 0.4 mm or more and 1.2 mm or less, in a case where the tooth pitch is 3 mm or more and less than 4 mm, the back portion has a thickness of 0.6 mm or more and 1.8 mm or less, and in a case where the tooth pitch is 4 mm or more and 5 mm or less, the back portion has a thickness of 1.2 mm or more and 2.3 mm or less.

Such thickness of the back portion is approximately the same as, for example, a thickness of a back portion of a conventional helical toothed belt used in an electric parking brake system or the like. The helical toothed belt power-transmission device of the present invention can increase the rigidity of the back portion without increasing the thickness of the back portion. Therefore, vibration and noise can be further prevented while sufficiently securing bending fatigue resistance.

In the helical toothed belt power-transmission device of the present invention, it is preferable that the back portion includes a rubber component, and the rubber component includes at least an ethylene-propylene-diene terpolymer or a hydrogenated nitrile rubber.

In the helical toothed belt power-transmission device of the present invention, it is preferable that the tooth fabric is formed of a woven fabric including warp yarns and weft yarns, the warp yarns or the weft yarns are disposed so as to extend in the belt longitudinal direction, and the warp yarns or weft yarns disposed so as to extend in the belt longitudinal direction include an elastic yarn having stretchability.

In the helical toothed belt power-transmission device of the present invention, it is preferable that fibers constituting the tooth fabric include at least one type of fibers selected from the group consisting of nylon, aramid, polyester, polybenzoxazole, and cotton.

In the helical toothed belt power-transmission device of the present invention, a rotational speed of the drive pulley may be 1,000 rpm or more and 10,000 rpm or less. According to this configuration, noise and vibration can be sufficiently reduced in the belt power-transmission device used at high-speed rotation.

In the helical toothed belt power-transmission device of the present invention, a load of the driven pulley may be 1 Nm or more and 6 Nm or less. According to this configuration, noise and vibration can be sufficiently reduced in the belt power-transmission device used at high load.

The helical toothed belt power-transmission device of the present invention is preferably applied to an electric parking brake system for automobile. According to this configuration, the noise and vibration can be sufficiently reduced in an electric parking brake system for automobile.

Advantageous Effects of Invention

The helical toothed belt power-transmission device of the present invention can further prevent noise and vibration due to the compression ratio of tooth portions and the rigidity of the back portion even in the case where a helical toothed belt having a narrow width is used at high load or high-speed rotation.

BRIEF DESCRIPTION OF DRAWINGS

FIG. 1 is a side view of a helical toothed belt power-transmission device of the present embodiment.

FIG. 2 is a partial perspective view illustrating a helical toothed belt.

FIG. 3 is a view illustrating a helical toothed belt viewed from an inner peripheral side.

FIG. 4 is a view illustrating the relationship between a tooth height of tooth portions of a helical toothed belt and a groove depth of a pulley groove.

FIG. 5 shows examples of graphs of $1-W\cdot\tan\theta/Pt=0$ and $1-W\cdot\tan\theta/Pt=0.75$, where (a) of FIG. 5 is a graph showing a case where a tooth pitch Pt is 2 mm, (b) of FIG. 5 is a graph showing a case where the tooth pitch Pt is 3 mm, and (c) of FIG. 5 is a graph showing a case where the tooth pitch Pt is 5 mm.

DESCRIPTION OF EMBODIMENTS

An embodiment of the present invention will be described below.

As illustrated in FIG. 1, a helical toothed belt power-transmission device 1 of the present embodiment includes a helical toothed belt 10, a drive pulley 2, and a driven pulley 3. The drive pulley 2 has a diameter smaller than a diameter of the driven pulley 3. The drive pulley 2 has drive pulley grooves 2a that mesh with tooth portions 12 of the helical toothed belt 10. The driven pulley 3 has driven pulley grooves 3a that mesh with the tooth portions 12 of the helical toothed belt 10. The drive pulley grooves 2a has a pulley groove depth Dp (see FIG. 4) that is the same as a pulley groove depth Dp of the driven pulley grooves 3a.

The helical toothed belt power-transmission device 1 is applied to an electric parking brake system for automobile. The drive pulley 2 is rotatably driven by an electric motor (drive source) (not illustrated). Two planetary gears are coaxially connected to the driven pulley 3, so as to configure a gear mechanism together with the driven pulley 3. A driving force of the electric motor is decelerated by the helical toothed belt power-transmission device 1 and a plurality of planetary gears, then converted to a rectilinear motion, and transmitted to the wheel brakes so as to apply a braking force to wheels. The above-described configuration of the electric parking brake system is an example, without being limited thereto. A rotational speed of the drive pulley 2 is, for example, 1,000 rpm or more and 10,000 rpm or less. A load of the driven pulley 3 is, for example, 1 Nm or more and 6 Nm or less.

[Configuration of Helical Toothed Belt]

As illustrated in FIG. 2, the helical toothed belt 10 includes a back portion 11 in which tension members 13 are embedded, and a plurality of tooth portions 12 provided on an inner peripheral surface of the back portion 11 at predetermined intervals along a belt longitudinal direction. The tooth portions 12 are provided on an inner peripheral surface of the helical toothed belt 10. As illustrated in FIG. 3, the tooth portions 12 extend obliquely with respect to the belt width direction. In FIG. 3, only lines of tooth tips of the tooth portions 12 are illustrated. The shape of the tooth portions 12 is not limited to a convex shape constituted by a curve as illustrated in FIG. 2 and FIG. 4, but may also be a substantially trapezoidal shape. That is, tooth tips of the tooth portions 12 are not limited to an arc shape as illustrated in FIG. 2 and FIG. 4, but may also be a substantially linear shape. The helical toothed belt 10 includes a belt main body 14 that is formed of a rubber composition, the tension members 13 that are embedded in the belt main body 14, and a tooth fabric 15 that covers an inner peripheral surface of the belt main body 14. An outer peripheral surface of the belt body 14 is not covered by a back fabric. The tooth portions 12 are constituted by a part of the belt main body 14 and a part of the tooth fabric 15. The back portion 11 is constituted by a part of the belt main body 14 and a part of the tooth fabric 15. That is, a surface of the tooth portions 12 and a portion where the tooth portions 12 are not provided on the inner peripheral surface of the back portion 11 are constituted by the tooth fabric 15.

As illustrated in FIG. 4, the tooth portions 12 has a tooth height Ht that is equal to or larger than the pulley groove depth Dp of the drive pulley grooves 2a of the drive pulley 2. FIG. 4 illustrates the case where the tooth height Ht is larger than the pulley groove depth Dp. Therefore, the tooth tips of the tooth portions 12 are in a state only in contact with the drive pulley grooves 2a or in a state of being compressed by being pressed thereagainst. A compression ratio of the tooth portions 12 due to the drive pulley grooves 2a is 0 to 5%, and more preferably 2 to 4%. The pulley groove depth Dp of the driven pulley grooves 3a is generally the same as the pulley groove depth Dp of the drive pulley grooves 2a. That is, the compression ratio of the tooth portions 12 due to the driven pulley grooves 3a is generally the same as the compression ratio of the tooth portions 12 due to the drive pulley grooves 2a. In this specification, the numerical range represented by "X to Y" means "X or more and Y or less". The compression ratio is defined as (tooth height Ht−pulley groove depth Dp)/tooth height Ht×100. The compression ratio of 0 to 5% is, for example, a case where the pulley groove depth Dp is 1.14 mm and the tooth height Ht is 1.14 to 1.20 mm.

The helical toothed belt 10 has a belt width W (see FIG. 3) of 1 to 20 mm, preferably 3 to 6 mm. An inclination angle of the tooth portion 12 with respect to the belt width direction is defined as a tooth trace angle $\theta$ (see FIG. 3). As illustrated in FIG. 3, when an interval from the end of meshing of a first tooth portion and the start of meshing of an adjacent second tooth portion is d, the interval d is represented by $d = Pt - W \cdot \tan \theta$. Further, $d/Pt$ is defined as X. That is, X is represented by the following formula.

$$X = d/Pt = 1 - W \cdot \tan \theta / Pt$$

In the present embodiment, X>0, preferably, X>0.75. Moreover, X<1 is preferable. Since X>0 (i.e., d>0), meshing of the second tooth starts after the end of meshing of the first tooth. (a) to (c) of FIG. 5 show graphs of $1 - W \cdot \tan \theta / Pt = 0$ and $1 - W \cdot \tan \theta / Pt = 0.75$ with W, $\theta$ and Pt in one example of the present embodiment. (a) of FIG. 5 shows a graph of the case where the tooth pitch Pt is 2 mm, (b) of FIG. 5 shows a graph of the case where the tooth pitch Pt is 3 mm, and (c) of FIG. 5 shows a graph of the case where the tooth pitch Pt is 5 mm.

The tooth pitch Pt (see FIG. 2) of the tooth portions 12 is, for example, from 2 to 5 mm. In the case where the tooth pitch Pt is 2 mm or more and less than 3 mm, the tooth height Ht (see FIG. 2) of the tooth portions 12 is, for example, from 0.7 to 2.0 mm, preferably 0.8 min or more, and preferably 1.0 mm or less. In the case where the tooth pitch Pt is 3 mm or more and less than 4 mm, the tooth height Ht of the tooth portions 12 is, for example, from 1.0 to 2.3 mm, preferably 1.1 mm or more, and preferably 2.0 mm or less. In the case where the tooth pitch Pt is 4 mm or more and 5 mm or less, the tooth height Ht of the tooth portions 12 is, for example, from 1.5 to 2.3 mm, preferably 1.7 mm or more, and preferably 2.0 mm or less. In the case where the tooth pitch Pt is 2 mm or more and less than 3 mm, a thickness Tb (see FIG. 2) of the back portion 11 is, for example, from 0.4 to 1.2 mm, preferably 0.6 mm or more, and preferably 0.9 mm or less. In the case where the tooth pitch Pt is 3 mm or more and less than 4 mm, the thickness Tb of the back portion 11 is, for example, from 0.6 to 1.8 mm, preferably 0.8 mm or more, and preferably 1.2 mm or less. In the case where the tooth pitch Pt is 4 mm or more and 5 mm or less, the thickness Tb of the back portion 11 is, for example, from 1.2 to 2.3 mm, preferably 1.8 mm or more, and preferably 2.2 mm or less. The tooth trace angle $\theta$ is, for example, 2 to 7°, preferably 2 to 6°.

[Belt Main Body]

As rubber components of the rubber composition constituting the belt main body 14, use can be made of chloroprene rubber (CR), nitrile rubber, hydrogenated nitrile rubber (HNBR), ethylene-propylene copolymer (EPM), ethylene-propylene-diene terpolymer (EPDM), styrene-butadiene rubber, butyl rubber, chlorosulfonated polyethylene rubber, and the like. A particularly preferred rubber component is an ethylene-propylene-diene terpolymer (EPDM), and chloroprene rubber and hydrogenated nitrile rubber (HNBR) are also preferably used. In the belt main body 14, the portion constituting the tooth portions 12 and the portion constituting the back portion 11 may be formed of the same rubber composition or may be formed of different rubber compositions.

The rubber composition constituting the belt main body 14 may contain various conventional additives (or compounding agents), if necessary. Examples of the additives include vulcanizing agents or crosslinking agents (e.g., oximes (quinone dioxime, etc.), guanidines (diphenylguanidine, etc.), metal oxides (magnesium oxide, zinc oxide, etc.)), vulcanization aids, vulcanization accelerators, vulcanization retarders, reinforcing agents (carbon black, silicon oxide such as hydrated silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softening agents (oils such as paraffin oil and naphthenic oil, etc.), processing agents or processing aids (stearic acid, metal salts of stearic acid, wax, paraffin, etc.), anti-aging agents (aromatic amine type or benzimidazole type anti-aging agents, etc.), stabilizers (anti-oxidizing agents, ultraviolet absorbers, heat stabilizers, etc.), lubricants, flame retardants, antistatic agents, or the like. These additives can be used singly or in combination, and can be selected according to the kind, application, performance, or the like of the rubber component.

[Tension Members]

The tension members 13 are embedded in the belt main body 14 along the belt longitudinal direction. The tension members 13 are spirally embedded at intervals in the belt width direction. The tension member 13 is formed of a twisted cord formed by twisting a plurality of strands. A single strand may be formed by bundling and aligning filaments (long fibers). The tension member 13 has a diameter of 0.2 to 0.9 mm There are no particular restrictions on the thickness of the filament forming the twisted cord, the number of filaments bundled, the number of strands, and the twisting configuration such as twisting manner. The material of the filament is high-strength glass fiber or carbon fiber. Both the high-strength glass fiber and the carbon fiber are high in strength and low in elongation, and are suitable as the material of the tension members 13. From the viewpoint of low cost, high-strength glass fiber is more preferable.

As the high-strength glass fiber, for example, one having a tensile strength of 300 kg/cm$^2$ or more and particularly, the glass fiber having a composition shown in the following Table 1 which contains more Si component than non-alkali glass fiber (E glass fiber) can be suitably used. In Table 1 below, the composition of the E glass fiber is also described for comparison. Examples of such high-strength glass fibers include K glass fiber, U glass fiber (both manufactured by Nippon Glass Fiber Co., Ltd.), T glass fiber (manufactured by Nitto Bosch Co., Ltd.), R glass fiber (manufactured by Vetrotex), S glass fiber, S-2 glass fiber, ZENTRON glass fiber (all manufactured by Owens Corning Fiberglass), and the like.

TABLE 1

| Ingredient item | High-strength glass fiber | E glass fiber |
| --- | --- | --- |
| SiO | 58 to 70 | 52 to 56 |
| $Al_2O_3$ | 17 to 27 | 12 to 16 |
| MgO | 7 to 17 | 0 to 6 |
| CaO | 0 to 10 | 12 to 25 |
| $Na_2O$ | 0 to 2 | 0 to 0.8 |
| $K_2O$ | 0 to 2 | 8 to 13 |
| $B_2O_3$ | 0 to 2 | |
| Including impurities such as $Fe_2O_3$ and $TiO_2$. | | |

Examples of the carbon fiber include a pitch-based carbon fiber, a polyacrylonitrile (PAN)-based carbon fiber, a phenol resin-based carbon fiber, a cellulose-based carbon fiber, a polyvinyl alcohol-based carbon fiber, and the like. As a commercially available product of carbon fibers, for example, use can be made of "Torayca (registered trademark)" manufactured by Toray Industries, Inc., "Tenax (registered trademark)" manufactured by Toho Tenax, "Dialead (registered trademark)" manufactured by Mitsubishi Chemical Corporation, or the like. These carbon fibers can be used alone or in combination of two or more thereof. Among these carbon fibers, pitch-based carbon fibers and PAN-based carbon fibers are preferable, and PAN-based carbon fibers are particularly preferable.

The twisted cord used as the tension members 11 is preferably subjected to an adhesive treatment in order to enhance the adhesion with the belt main body 14. As the adhesive treatment, for example, a method in which the twisted cord is immersed in a resorcinol-formalin-latex treatment liquid (RFL treatment liquid) and then dried by heating to form an adhesive layer evenly on the surface can be adopted. The RFL treatment solution is obtained by mixing an initial condensate of resorcin and formalin with a latex, and examples of the latex used here include chloroprene, styrene-butadiene-vinylpyridine terpolymer (VP latex), hydrogenated nitrile, NBR, and the like. As the adhesive treatment, there is also a method of pretreating with an epoxy or isocyanate compound and then treating with the RFL treatment liquid, or the like.

[Tooth Fabric]

The tooth fabric 15 is preferably formed of a woven fabric woven by vertically and horizontally interlacing warp yarns and weft yarns according to a predetermined rule. The weaving manner of the woven fabric may be any of twill weave, satin weave and the like. The form of a warp yarn and a weft yarn may be any of a multifilament yarn obtained by aligning or twisting filaments (long fibers), a monofilament yarn as one long fiber, and a spun yarn obtained by twisting short fibers together. In the case where the warp yarn or weft yarn is a multifilament yarn or a spun yarn, it may be a blended twisted yarn or a blended spun yarn using a plurality of types of fibers. The weft yarn preferably contains an elastic yarn having stretchability. As the elastic yarn, for example, use can be made of one made of a material itself having stretchability, such as spandex made of polyurethane, or a processed yarn obtained by stretching (e.g., woolly processing, crimping processing, etc.) of a fiber(s). Normally, elastic yarn is not used for a warp yarn. Therefore, weaving is easy. As the tooth fabric 15, it is preferable that the warp yarns of the woven fabric are disposed to extend in the belt width direction and the weft yarns in the belt longitudinal direction. Accordingly, stretchability of the tooth fabric 15 in the belt longitudinal direction can be secured. The tooth fabric 15 may be disposed so that the weft yarns of the woven fabric are disposed to extend in the belt width direction and the warp yarns in the belt longitudinal direction. In this case, the elastic yarn having stretchability may be used as the warp yarn. As the material of the fibers constituting the tooth fabric 15, any one or combination of nylon, aramid, polyester, polybenzoxazole, cotton, and the like can be adopted.

The woven fabric used as the tooth fabric 15 may be subjected to an adhesive treatment in order to enhance the adhesion with the belt main body 14. As the adhesive treatment, a method of immersing the woven fabric in a resorcinol-formalin-latex (RFL liquid), and then dried by heating to uniformly form an adhesive layer on the surface thereof is generally used. However, it is not limited thereto, and a method of pretreating with an epoxy or isocyanate compound and then treating with the RFL liquid, as well as a method in which a rubber composition is dissolved in an organic solvent such as methyl ethyl ketone, toluene or xylene to form a rubber paste and the woven fabric is treated by being dipped in this rubber paste so as to impregnate and adhere the rubber composition, can also be adopted. These methods can be performed singly or in combination, and the order of processing and the number of times of processing are not particularly limited.

[Manufacturing Method of Helical Toothed Belt]

The helical toothed belt 10 is produced, for example, by the following procedure.

First, a woven fabric to form the tooth fabric 15, on which an adhesive treatment has been performed, is wound around a cylindrical mold (not illustrated) having a plurality of groove portions corresponding to the plurality of tooth portions 12 of the helical toothed belt 10. Subsequently, a twisted cord to constitute the tension members 13 is spirally spun around the outer peripheral surface of the wound woven fabric. Then, an unvulcanized rubber sheet to form the belt main body 14 is wound around the outer peripheral side thereof, to thereby form an unvulcanized belt molded body. Then, in a state in which the belt molded body is disposed on the outer periphery of the cylindrical mold, a rubber-made jacket which is a steam-shielding material is further covered on the outside thereof. Next, the belt molded body and the cylindrical mold covered with the jacket are accommodated inside a vulcanization can. Then, the belt molded body is heated and pressurized inside the vulcanization can so as to vulcanize the rubber sheet. Thus, the rubber composition of the rubber sheet is press-fitted into the groove portions of the mold, and the tooth portions 12 are formed. Then, the sleeve-like molded body is released from the mold and cut to a predetermined width, whereby a plurality of helical toothed belts 10 are obtained.

The helical toothed belt 10 of the present embodiment has the following features.

The compression ratio of the tooth portions 12 of the helical toothed belt 10 due to the pulley grooves 2a, 3a is 0% or more and 5% or less. That is, the tooth tips of the tooth portions 12 come into contact with the pulley grooves 2a, 3a. In the case of a conventional helical toothed belt power-transmission device in which tooth tips of tooth portions do not come into contact with pulley grooves, a load applied to the belt at the time of traveling cannot be borne by the tooth tips of the tooth portions, and all of the load applied to the belt is borne only by tooth bottoms of the belt. Therefore, vertical movement of the belt (string vibration), which occurs when the tooth portions mesh with the pulley grooves, is violent, and vibration and noise occur. In the present invention, the tooth tips of the tooth portions 12 come into contact with the pulley grooves 2a, 3a, and the load applied to the belt is distributed to the tooth tips as well. Therefore, even in the case of being used at high load or high-speed rotation, vibration and noise can be prevented. Furthermore, since the tooth tips of the tooth portions 12 come into contact with the pulley grooves 2a, 3a, positioning accuracy of the tooth portions 12 with respect to the pulley grooves 2a, 3a is improved, and improper interference in meshing between the tooth portions 12 and the pulley grooves 2a, 3a is prevented. Accordingly, vibration and noise can be further prevented.

Moreover, the tension member 13 embedded in the back portion 11 of the helical toothed belt 10 is formed of a twisted cord containing a high-strength glass fiber or carbon fiber, which is a high-strength (high elastic modulus) fiber material, and having a diameter of from 0.2 to 0.9 mm Therefore, the rigidity of the back portion 11 can be increased by the tension members 13 while securing the bendability of the back portion 11. Since the rigidity of the back portion 11 is enhanced, even in the case of being used at high load or high-speed rotation, vibration (string vibration) about the tension members 13 of the helical toothed belt 10 generated when the tooth portions 12 mesh with the tooth portions 12 of the pulley can be prevented. Therefore, noise generated by this vibration can be reduced.

In this way, the helical toothed belt power-transmission device 1 of the present embodiment can further prevent noise and vibration due to the compression ratio of the tooth portions 12 and the rigidity of the back portion 11 even in the case where the helical toothed belt 10 having a narrow width is used at high load or high-speed rotation.

It is preferable that in the case where the tooth pitch of the tooth portions 12 is 2 mm or more and less than 3 mm, the back portion 11 has a thickness of 0.4 mm or more and 1.2 mm or less, in the case where the tooth pitch is 3 mm or more and less than 4 mm, the back portion 11 has a thickness of 0.6 mm or more and 1.8 mm or less, and in the case where the tooth pitch of the plurality of the tooth portions 12 is 4 mm or more and 5 mm or less, the back portion 11 has a thickness of 1.2 mm or more and 2.3 mm or less.

Such thickness of the back portion 11 is approximately the same as, for example, a thickness of a back portion of a conventional helical toothed belt used in an electric parking brake system or the like. The helical toothed belt power-transmission device 1 of the present embodiment can increase the rigidity of the back portion 11 without increasing the thickness of the back portion 11. Therefore, vibration and noise can be further prevented while sufficiently securing bending fatigue resistance.

Although the preferred embodiment of the present invention is described above, the present invention is not limited to the embodiment described above, and various modifications can be made within the range described in the scope of claims.

For example, the helical toothed belt power-transmission device 1 may include a plurality of driven pulleys 3. Application subjects of the helical toothed belt power-transmission device of the present invention is not limited to an electric parking brake system.

EXAMPLES

Next, specific Examples of the present invention will be described.

Twisted cords of A1 to A6 having the constitution shown in Table 2 below were prepared as the tension members of the helical toothed belt of Examples 1 to 40 and Comparative Examples 1 to 8. The twisted cord of A1 was prepared by the following procedure. Filaments of the glass fiber of the designation KCG 150 described in JIS R 3413 (2012)

were bundled and aligned to make three strands. These three strands were immersed in an RFL liquid having a composition shown in Table 3 below and dried by heating at 200 to 280° C. to uniformly form an adhesive layer on the surface. After this adhesive treatment, these three strands were primary-twisted with the number of twist of 12 times/ 10 cm, without performing final twist, thereby prepare a twisted cord having a diameter of 0.35 mm as a single twist. The twisted cords of A2, A3 and A4 were prepared in the same procedure as in A1 so as to prepare a twisted cord having a diameter of 0.35 mm as a single twist, except that the glass fibers were changed to UCG 150, SCG 150 and ECG 150, respectively. The twisted cord of A5 was prepared in the same procedure as in A1 to A4 so as to prepare a twisted cord having a diameter of 0.53 mm as a single twist, except that the used strands were changed to one strand obtained by bundling and aligning filaments (3K) of carbon fibers. The twisted cord of A6 was prepared in the same procedure as in A1 so as to prepare a twisted cord having a diameter of 0.85 mm, except that the twisting manner of the three strands after the adhesive treatment was changed to a twisting manner in which six cords primary-twisted with the number of twist of 8 times/10 cm were further final-twisted with the number of twist of 8 times/10 cm (Lang's lay).

TABLE 2

|  | A1 | A2 | A3 | A4 | A5 | A6 |
|---|---|---|---|---|---|---|
| Material | K glass fiber | U glass fiber | S glass fiber | E glass fiber | Carbon fiber | K glass fiber |
| Filament diameter (μm) | 9 | 9 | 9 | 9 | 7 | 9 |
| Strand configuration | KCG150-3/0 | UCG150-3/0 | SCG150-3/0 | ECG150-3/0 | 3K-1/0 | KCG150-3/6 |
| Number of primary twist (times/10 cm) | 12 | 12 | 12 | 12 | 12 | 8 |
| Number of final twist (times/10 cm) | — | — | — | — | — | 8 |
| Twisting manner | Single twist | Single twist | Single twist | Single twist | Single twist | Lang's lay |
| Cord diameter (mm) | 0.35 | 0.35 | 0.35 | 0.35 | 0.53 | 0.85 |

TABLE 3

|  | parts by mass |
|---|---|
| Resorcinol | 1.35 |
| Formalin (solid content concentration: 37%) | 1 |
| Vinyl pyridine latex (solid content concentration: 40%) | 130 |
| Water | 50 |

A woven fabric of twill weave was used as the tooth fabrics of the helical toothed belts of Examples 1 to 40 and Comparative Examples 1 to 8. As the weft yarns and the warp yarns of the woven fabric, multifilament yarn of 66 nylon with a fineness of 155 dtex was used. Here, dtex (decitex) is the mass of 10,000 meters of the yarn in grams.

Unvulcanized rubber sheets respectively having compositions C1 to C3 shown in Table 4 below were prepared as unvulcanized rubber sheets to form the belt main body of the helical toothed belt of Examples 1 to 40 and Comparative Examples 1 to 8.

TABLE 4

|  | C1 parts by mass | C2 parts by mass | C3 parts by mass |
|---|---|---|---|
| EPDM *1 | 100 | — | — |
| Chloroprene rubber (CR) *2 | — | 100 | — |
| H-NBR *3 | — | — | 100 |
| Adipic acid plasticizer | 0.5 | 8.75 | — |
| Magnesium oxide | — | 4 | — |

TABLE 4-continued

|  | C1 parts by mass | C2 parts by mass | C3 parts by mass |
|---|---|---|---|
| Oil | 8 | — | — |
| Stearic acid | — | — | 1 |
| Anti-aging agent *4 | 2 | 16.75 | — |
| Vulcanization accelerator *5 | 3.4 | 1.5 | 0.5 |
| Carbon black *6 | 50 | 45 | 50 |
| Inorganic filler | 5 | 35 | — |
| Zinc oxide *7 | 5 | 5 | 5 |
| Sulfur | 1 | 0.5 | 1.5 |
| Total | 174.9 | 216.5 | 158 |

*1 "EPT" manufactured by Mitsui Chemicals, Inc.
*2 "PM-40" made by Denka
*3 "Zetpole 2021" manufactured by Zeon Corporation
*4 "Nocrack MB" manufactured by Ouchi Shinko Chemical Industrial Co., Ltd.
*5 "N-cyclohexyl-2 benzothiazole sulfenamide" manufactured by Ouchi Shinko Chemical Industrial Co., Ltd.
*6 "Seast 3" manufactured by Tokai Carbon Co., Ltd.
*7 "Zinc oxide third grade" manufactured by Seido Chemical Industry Co., Ltd.

The helical toothed belts of Examples 1 to 40 and Comparative Examples 1 to 8 were prepared by using the twisted cords (tension members) A1 to A5, the tooth fabric, and the unvulcanized rubber sheets of the compositions C1 to C3, in accordance with the procedure described in the embodiment. Vulcanization was performed at 161° C. for 25 minutes. Formulations of the helical toothed belts in Examples 1 to 40 and Comparative Examples 1 to 8 are shown in Table 5 to Table 9. The belt tooth number of all the helical toothed belts in Examples 1 to 40 and Comparative Examples 1 to 8 was 68. The belt circumferential length of Examples 1 to 25 and Comparative Examples 1 to 4 (each having a tooth pitch of 3 mm) was 204 mm. The belt circumferential length of Examples 26 to 35 and Comparative Examples 5 and 6 (each having a tooth pitch of 2 mm) was 136 mm. The belt circumferential length of Examples 36 to 40 and Comparative Examples 7 and 8 (each having a tooth pitch of 5 mm) was 340 mm Examples 1 to 8 are Examples 1 to 8 described in the basic application of the present application (Japanese Patent Application No. 2017-088566). Examples 9 to 16 are Examples 11 to 18 described in the above basic application. Comparative Examples 1 to 4 are Comparative Examples 1 to 4 described in the above basic application.

TABLE 5

| | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Tension member | A1 (K glass) | | | A2 (U glass) | A3 (S glass) | A5 (carbon) | A1 (K glass) | | (K glass) | | | A4 (E glass) |
| Rubber composition | C1 (EPDM) | | | | | | C3 (H-NBR) | C2 (CR) | C1 (EPDM) | | | |
| Tooth pitch (mm)  Pt | 3 | | | | | | | | 3 | | | |
| Belt width (mm)  W | 4.3 | | | | | | | | 4.3 | | | |
| Tooth trace angle (°)  θ | 2 | | | | | | | | 2 | | | |
| Back portion thickness (mm)  Tb | 1.00 | | | | | | | | 1.00 | | | |
| Tooth height (mm)  Ht | 1.14 | 1.18 | 1.20 | | | 1.18 | | | 1.10 | 1.22 | 1.26 | 1.18 |
| Pulley groove depth (mm)  Dp | | | | 1.14 | | | | | | | 1.14 | |
| Compression ratio (%) | 0.0 | 3.4 | 5.0 | | | 3.4 | | | −3.6 | 6.6 | 9.5 | |
| d (=Pt − W · tanθ) | | | | 2.85 | | | | | | | 2.85 | |
| X (=1 − W · tanθ/Pt) | | | | 0.95 | | | | | | | 0.95 | |
| Belt vibration (mm) | 0.075 | 0.070 | 0.075 | 0.070 | 0.072 | 0.070 | 0.072 | 0.073 | 0.084 | 0.080 | 0.085 | 0.090 |
| Sound pressure (dBA) | 72 | 70 | 72 | 70 | 71 | 70 | 70 | 71 | 77 | 76 | 79 | 75 |
| Cold resistance (low-temperature durability) | A | A | A | A | A | A | A | A | A | A | A | A |

TABLE 6

| | Example | | | | | | | | |
|---|---|---|---|---|---|---|---|---|---|
| | 2 | 9 | 10 | 11 | 12 | 13 | 14 | 15 | 16 |
| Tension member | A1 (K glass) | | | | | | | | |
| Rubber composition | C1 (EPDM) | | | | | | | | |
| Tooth pitch (mm)  Pt | 3 | | | | | | | | |
| Belt width (mm)  W | 4.3 | 3.0 | 10.0 | | 4.3 | | 3.0 | 5.0 | 18.0 |
| Tooth trace angle (°)  θ | 2 | 2 | 2 | 1 | 3 | 5 | 8 | 8 | 1 |
| Back portion thickness (mm)  Tb | 1.00 | | | | | | | | |
| Tooth height (mm)  Ht | 1.18 | | | | | | | | |
| Pulley groove depth (mm)  Dp | 1.14 | | | | | | | | |
| Compression ratio (%) | 3.4 | | | | | | | | |
| d (=Pt − W · tanθ) | 2.85 | 2.90 | 2.65 | 2.92 | 2.77 | 2.62 | 2.58 | 2.30 | 2.69 |
| X (=1 − W · tanθ/Pt) | 0.95 | 0.97 | 0.88 | 0.97 | 0.92 | 0.87 | 0.86 | 0.77 | 0.90 |
| Belt vibration (mm) | 0.070 | 0.075 | 0.060 | 0.079 | 0.065 | 0.060 | 0.055 | 0.056 | 0.060 |
| Sound pressure (dBA) | 70 | 70 | 74 | 74 | 69 | 68 | 60 | 69 | 74 |
| Cold resistance (low-temperature durability) | A | A | A | A | A | A | A | A | A |

TABLE 7

| | Example | | | | | | | | | |
|---|---|---|---|---|---|---|---|---|---|---|
| | 17 | 2 | 18 | 19 | 20 | 21 | 22 | 23 | 24 | 25 |
| Tension member | A1 (K glass) | | | | | | | | | |
| Rubber composition | C1 (EPDM) | | | | | | | | | |
| Tooth pitch (mm)  Pt | 3 | | | | | | | | | |
| Belt width (mm)  W | 4.3 | | | | | | 3.0 | 10 | 4.3 | |
| Tooth trace angle (°)  θ | 2 | | | | | | | | 1 | 8 |
| Back portion thickness (mm)  Tb | 0.70 | 1.00 | 1.38 | 1.76 | 2.00 | 0.80 | 1.76 | 1.76 | 1.76 | 1.76 |
| Tooth height (mm)  Ht | 1.18 | | | | | | | | | |
| Pulley groove depth (mm)  Dp | 1.14 | | | | | | | | | |
| Compression ratio (%) | 3.4 | | | | | | | | | |
| d (=Pt − W · tanθ) | 2.85 | | | | | 2.90 | 2.90 | 2.65 | 2.92 | 2.40 |
| X (=1 − W · tanθ/Pt) | 0.95 | | | | | 0.97 | 0.97 | 0.88 | 0.97 | 0.80 |
| Belt vibration (mm) | 0.075 | 0.070 | 0.065 | 0.060 | 0.055 | 0.079 | 0.066 | 0.055 | 0.076 | 0.079 |
| Sound pressure (dBA) | 74 | 70 | 66 | 61 | 56 | 74 | 65 | 68 | 71 | 59 |
| Cold resistance (low-temperature durability) | A | A | B | B | C | A | B | B | B | B |

TABLE 8

| | | Example | | | | | | Comparative Example | | Example | | | |
|---|---|---|---|---|---|---|---|---|---|---|---|---|---|
| | | 26 | 27 | 28 | 29 | 30 | 31 | 5 | 6 | 32 | 33 | 34 | 35 |
| Tension member | | A1 (K glass) | | | | | | | | | | | |
| Rubber composition | | C1 (EPDM) | | | | | | | | | | | |
| Tooth pitch (mm) | Pt | 2 | | | | | | | | | | | |
| Belt width (mm) | W | 4.3 | | | | | | | | 3.0 | | 10.0 | 18.0 |
| Tooth trace angle (°) | θ | 2 | | | | | | | | 1 | 8 | 2 | 1 |
| Back portion thickness (mm) | Tb | 0.48 | 0.60 | 0.83 | 1.30 | | | | | 0.60 | | | |
| Tooth height (mm) | Ht | 0.76 | | | | 0.73 | 0.77 | 0.71 | 0.79 | 0.76 | | | |
| Pulley groove depth (mm) | Dp | 0.73 | | | | | | | | | | | |
| Compression ratio (%) | | 3.4 | | | | 0.0 | 5.0 | −3.6 | 6.6 | 3.4 | | | |
| d (=Pt − W · tanθ) | | 1.85 | | | | | | | | 1.95 | 1.58 | 1.65 | 1.69 |
| X (=1 − W · tanθ/Pt) | | 0.92 | | | | | | | | 0.97 | 0.79 | 0.83 | 0.84 |
| Belt vibration (mm) | | 0.070 | 0.065 | 0.058 | 0.053 | 0.071 | 0.070 | 0.079 | 0.080 | 0.066 | 0.056 | 0.059 | 0.058 |
| Sound pressure (dBA) | | 72 | 69 | 60 | 55 | 71 | 71 | 76 | 75 | 66 | 60 | 72 | 70 |
| Cold resistance (low-temperature durability) | | A | A | A | C | A | A | A | A | A | A | A | A |

TABLE 9

| | | Example | | | | | Comparative Example | |
|---|---|---|---|---|---|---|---|---|
| | | 36 | 37 | 38 | 39 | 40 | 7 | 8 |
| Tension member | | A6 (K glass) | | | | | | |
| Rubber composition | | C1 (EPDM) | | | | | | |
| Tooth pitch (mm) | Pt | 5 | | | | | | |
| Belt width (mm) | W | 4.3 | | | | | | |
| Tooth trace angle (°) | θ | 2 | | | | | | |
| Back portion thickness (mm) | Tb | 1.60 | 2.20 | 2.50 | 2.20 | | | |
| Tooth height (mm) | Ht | 1.91 | | | 1.85 | 1.94 | 1.78 | 1.98 |
| Pulley groove depth (mm) | Dp | 1.85 | | | | | | |
| Compression ratio (%) | | 3.4 | | | 0.0 | 5.0 | −3.6 | 6.6 |
| d (=Pt − W · tanθ) | | 4.85 | | | | | | |
| X (=1 − W · tanθ/Pt) | | 0.97 | | | | | | |
| Belt vibration (mm) | | 0.079 | 0.072 | 0.068 | 0.074 | 0.074 | 0.081 | 0.080 |
| Sound pressure (dBA) | | 74 | 69 | 65 | 72 | 72 | 77 | 76 |
| Cold resistance (low-temperature durability) | | A | B | C | B | B | B | B |

(Belt Amplitude Measurement Test)

A belt amplitude measurement test was performed by using the helical toothed belts of Examples 1 to 40 and Comparative Examples 1 to 8 to evaluate the belt amplitude (vibration) during running of the belt. A two-axis running tester was used for the test. Like a drive device of an electric parking brake system, the two-axis running tester had a configuration including a drive pulley and a driven pulley having a diameter larger than that of the drive pulley. A pulley with the number of teeth of 15 was used for the drive pulley and a pulley with the number of teeth of 47 was used for the driven pulley. The distance between the shafts was fixed at 53.3 mm, and the helical toothed belt was wound on the two pulleys. A load of 2.0 Nm was applied to the driven pulley side, and the drive pulley was rotated at a rotational speed of 4,000 rpm to run the belt. The ambient temperature was 23° C. Then, the amplitude (vibration) of the belt was measured with a laser displacement meter. The laser displacement meter was disposed at a position 30 mm away from the intermediate position of the tension side portion of the helical toothed belt. Just in order to explain the position of the laser displacement meter, the laser displacement meter M is illustrated in FIG. 1.

The measurement results of the belt vibration are shown in Table 5 to Table 9. The cases where the belt vibration was 0.079 mm or less were evaluated as acceptable as an amplitude level causing no problem in the practical use of the belt.

(Sound Pressure Measurement Test)

The sound pressure (noise level) was measured under the same layout and the same evaluation condition as in the test layout of the belt amplitude measurement test described above, except that the laser displacement meter was changed to a sound-collecting microphone of a noise meter. Regarding the position of the sound-collecting microphone, similar to the position of the laser displacement meter, it was disposed at a position 30 mm away from the intermediate position of the tension side portion of the helical toothed belt.

The measurement results of the sound pressure are shown in Table 5 to Table 9. The cases where the sound pressure was 75 dBA or less were determined as acceptable as a noise level causing no problem in the practical use of the belt.

(Cold Resistance Test)

A test of cold resistance (low-temperature durability) was performed by using a two-axis running tester with the same layout as the belt amplitude measurement test described above. The ambient temperature was −40° C., and the drive pulley was rotated at a rotational speed of 2,000 rpm under no load. With the operation of running for 6 seconds and then stopping for 10 minutes as one cycle, 1,000 cycles were performed. Then, at the 500th cycle and the 1,000th cycle, whether or not a crack occurred on the back side of the belt (the surface of the back portion) was visually confirmed.

The confirmation results are shown in Table 5 to Table 9 by using ranks A, B, and C. The rank A is the case where no crack occurred even at the 1,000th cycle. The rank B is the case where no crack occurred at the 500th cycle but a crack occurred at the 1,000th cycle. The rank C is the case where a crack occurred at the 500th cycle. As an index of cold resistance (low-temperature durability), in the case where a belt is used in a cold region such that the lowest temperature reaches −40° C., compared to the belt of rank A, the ranks B and C are graded worse low-temperature durability, which is likely to reach the crack life in this order. From a viewpoint of an adequacy for actual use in a cold region such that the lowest air temperature reaches −40° C., the belts of ranks A and B are suitable, and in particular, a belt of rank A is suitably used.

<Evaluation>

Examples 1 to 3 are examples in which helical toothed belts of the same constituent material had varied tooth heights with respect to the same pulley groove depth, and were determined as acceptable in both belt vibration and sound pressure. In addition, each had a cold resistance of A rank.

Examples 4 to 6 are examples in which only the type of the tension members was different from that of the Example 2, but since each was a high-strength glass fiber or a carbon fiber, they were determined as acceptable in both belt vibration and sound pressure. In addition, each had a cold resistance of A rank.

Examples 7 and 8 are examples in which only the rubber component was different from that of the Example 2, and each was determined as acceptable in both belt vibration and sound pressure. In addition, each had a cold resistance of A rank.

Comparative Examples 1 to 3 are examples in which the tooth height was varied with respect to Examples 1 to 3 and the compression ratio was out of the range of 0 to 5.0%. In Comparative Examples 1 to 3, both the belt vibration and the sound pressure were larger vales than the acceptable determination criteria. As a result, it was confirmed that in the case where the tooth pitch is 3 mm, the effect of preventing noise and vibration is obtained in a helical toothed belt power-transmission device having a compression ratio of 0 to 5.0%.

Comparative Example 4 is a helical toothed belt power-transmission device whose compression ratio was within the range of 0 to 5.0%, but since tension members of an E glass fiber, which is not a high-strength glass fiber, was used, the belt vibration was the largest value.

Examples 9 and 10 are examples in which the belt width was varied with respect to Example 2. Although there is a tendency of a slightly increasing sound pressure as the belt width is widened, each was determined as acceptable in both belt vibration and sound pressure. In addition, each had a cold resistance of A rank.

Examples 12 and 13 are examples in which the tooth trace angle was varied with respect to Example 2, and each was determined as acceptable in both belt vibration and sound pressure. In addition, each had a cold resistance of A rank.

Examples 11 and 14 to 16 are examples in which both the belt width and the tooth trace angle were varied with respect to Example 2, and each satisfies X>0.75. Each was determined as acceptable in both belt vibration and sound pressure, and had a cold resistance of A rank.

Examples 17 to 20 are examples in which the thickness of the back portion was varied with respect to Example 2. From Examples 17 to 20, it was confirmed that in the case where the tooth pitch is 3 mm, as the thickness of the back portion increases, the belt vibration and the sound pressure are reduced (i.e., vibration and noise are prevented), while cold resistance is deteriorated. The reason is considered as that as the thickness of the back portion increases, the rigidity of the belt increases and the flexibility is reduced.

Examples 21 and 22 are examples in which the thickness of the back portion was varied with respect to Example 9.

Example 23 is an example in which the thickness of the back portion was varied with respect to Example 10.

Examples 24 and 25 are examples in which the tooth trace angle was varied with respect to Example 19, whose thickness of the back portion is 1.76 mm Examples 26 to 29 are examples in which the tooth pitch was set to 2 mm and the thickness of the back portion was varied. From Examples 26 to 29, it was confirmed that in the case where the tooth pitch is 2 mm, as the thickness of the back portion increases, the belt vibration and the sound pressure are reduced, while cold resistance is deteriorated.

Examples 30 and 31 are examples in which the tooth height was varied with respect to Example 27, and each was determined as acceptable in both belt vibration and sound pressure. In addition, each had a cold resistance of A rank.

Comparative Examples 5 and 6 are examples in which the tooth height was varied with respect to Examples 30 and 31 and the compression ratio was out of the range of 0 to 5.0%. In Comparative Examples 5 and 6, the belt vibration was a larger value than the acceptable determination criterion. In Comparative Example 5, the sound pressure was also a larger value than the acceptable determination criterion. As a result, it was confirmed that in the case where the tooth pitch is 2 mm, the effect of preventing noise and vibration is obtained in a helical toothed belt power-transmission device having a compression ratio of 0 to 5.0%.

Examples 32 to 35 are examples in which both the belt width and the tooth trace angle were varied with respect to Example 2, and each satisfies X>0.75. Each was determined as acceptable in both belt vibration and sound pressure. In addition, each had a cold resistance of A rank.

Examples 36 to 38 are examples in which the tooth pitch was set to 5 mm and the thickness of the back portion was varied. From Examples 36 to 38, it was confirmed that in the case where the tooth pitch is 5 mm, as the thickness of the back portion increases, the belt vibration and the sound pressure are reduced, while cold resistance is deteriorated.

Examples 39 and 40 are examples in which the tooth height was varied with respect to Example 37, and each was determined as acceptable in both belt vibration and sound pressure. In addition, each had a cold resistance of B rank.

Comparative Examples 7 and 8 are examples in which the tooth height was varied with respect to Examples 37, 39 and 40 and the compression ratio was out of the range of 0 to 5.0%. In Comparative Examples 7 and 8, both the belt vibration and the sound pressure were larger values than the acceptable determination criteria. As a result, it was confirmed that in the case where the tooth pitch is 5 mm, the effect of preventing noise and vibration is obtained in a helical toothed belt power-transmission device having a compression ratio of 0 to 5.0%.

From the above, it was confirmed that a helical toothed belt, in which W, θ, and Pt are combined so as to satisfy X=1−W·tan θ/Pt=d/Pt>0 (d=Pt−W·tan θ>0), particularly X=1−W·tan θ/Pt=d/Pt>0.75 (d=Pt−W·tan θ>0.75Pt), is capable of preventing noise and vibration.

This application is based on Japanese Patent Application 2017-088566 filed on Apr. 27, 2017, and Japanese Patent Application 2018-037197 filed on Mar. 2, 2018, contents of which are incorporated by reference herein.

DESCRIPTION OF REFERENCE NUMERALS

1 Helical toothed belt power-transmission device
2 Drive pulley
2a Drive pulley groove
3 Driven pulley
3a Driven pulley groove
10 Helical toothed belt
11 Back portion
12 Tooth portion
13 Tension member
14 Belt main body
15 Tooth fabric
Dp Pulley groove depth
Ht Tooth height
Pt Tooth pitch
W Belt width
θ Tooth trace angle

The invention claimed is:

1. A helical toothed belt power-transmission device comprising:
   a helical toothed belt comprising:
      a back portion in which a tension member is embedded, and
      a plurality of tooth portions which are provided on one surface of the back portion at prescribed intervals along a belt longitudinal direction and each of which is inclined with respect to a belt width direction, surfaces of the tooth portions being formed of a tooth fabric;
   a drive pulley comprising drive pulley grooves meshing with the tooth portions and being configured to be rotatably driven by a drive source; and
   a driven pulley comprising driven pulley grooves meshing with the tooth portions,
   wherein the helical toothed belt has a belt width of 1 mm or more and 18 mm or less,
   wherein the tension member is a twisted cord comprising a high-strength glass fiber or a carbon fiber and having a diameter of 0.2 mm or more and 0.9 mm or less, and
   wherein a compression ratio of the tooth portions due to the drive pulley grooves and the driven pulley grooves, defined by the following formula, is 0% or more and 5% or less:

Compression ratio=(tooth height−pulley groove depth)/tooth height×100.

2. The helical toothed belt power-transmission device according to claim 1, satisfying:
   1−W·tan θ/Pt>0
   when a tooth pitch of the helical toothed belt is Pt, a belt width is W, and a tooth trace angle with respect to the belt width direction is θ.

3. The helical toothed belt power-transmission device according to claim 2, satisfying:
   1−W·tan θ/Pt>0.

4. The helical toothed belt power-transmission device according to claim 1,
   wherein the plurality of tooth portions have a tooth pitch of 2 mm or more and 5 mm or less, and
   wherein
      in a case where the tooth pitch is 2 mm or more and less than 3 mm, the tooth portions have a tooth height of 0.7 mm or more and 2.0 mm or less,
      in a case where the tooth pitch is 3 mm or more and less than 4 mm, the tooth portions have a tooth height of 1.0 mm or more and 2.3 mm or less, and
      in a case where the tooth pitch is 4 mm or more and 5 mm or less, the tooth portions have a tooth height of 1.5 mm or more and 2.3 mm or less.

5. The helical toothed belt power-transmission device according to claim 1,
   wherein the plurality of tooth portions have a tooth pitch of 2 mm or more and 5 mm or less, and
   wherein
      in a case where the tooth pitch is 2 mm or more and less than 3 mm, the back portion has a thickness of 0.4 mm or more and 1.2 mm or less,
      in a case where the tooth pitch is 3 mm or more and less than 4 mm, the back portion has a thickness of 0.6 mm or more and 1.8 mm or less, and
      in a case where the tooth pitch is 4 mm or more and 5 mm or less, the back portion has a thickness of 1.2 mm or more and 2.3 mm or less.

6. The helical toothed belt power-transmission device according to claim 1,
   wherein the back portion comprises a rubber component, and the rubber component comprises at least an ethylene-propylene-diene terpolymer or a hydrogenated nitrile rubber.

7. The helical toothed belt power-transmission device according to claim 1,
   wherein the tooth fabric is formed of a woven fabric including warp yarns and weft yarns, the warp yarns or the weft yarns are disposed so as to extend in the belt longitudinal direction, and the warp yarns or weft yarns disposed so as to extend in the belt longitudinal direction comprise an elastic yarn having stretchability.

8. The helical toothed belt power-transmission device according to claim 1,
   wherein fibers constituting the tooth fabric comprise at least one type of fibers selected from the group consisting of nylon, aramid, polyester, polybenzoxazole, and cotton.

9. The helical toothed belt power-transmission device according to claim 1,
   wherein a rotational speed of the drive pulley is 1,000 rpm or more and 10,000 rpm or less.

10. The helical toothed belt power-transmission device according to claim 1,
    wherein a load of the driven pulley is 1 Nm or more and 6 Nm or less.

11. The helical toothed belt power-transmission device according to claim 1, which is applied to an electric parking brake system for automobile.

12. The helical toothed belt power-transmission device according to claim 1, wherein the belt width of the helical toothed belt is 1 mm or more and 10 mm or less.

* * * * *